Feb. 15, 1966  J. POUILLOUX  3,235,435
MACHINE FOR BUILDING PNEUMATIC TIRES
Filed Sept. 29, 1964  7 Sheets-Sheet 1

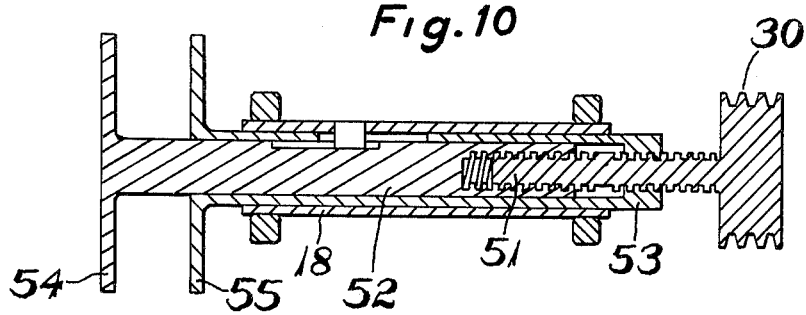
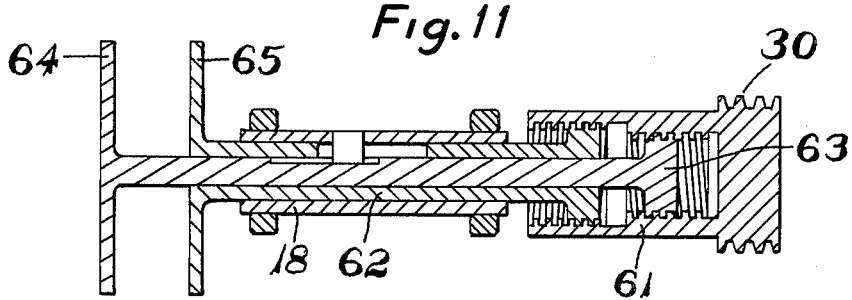
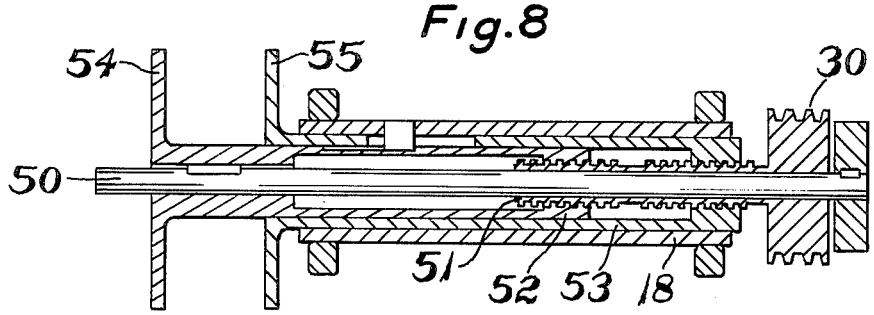
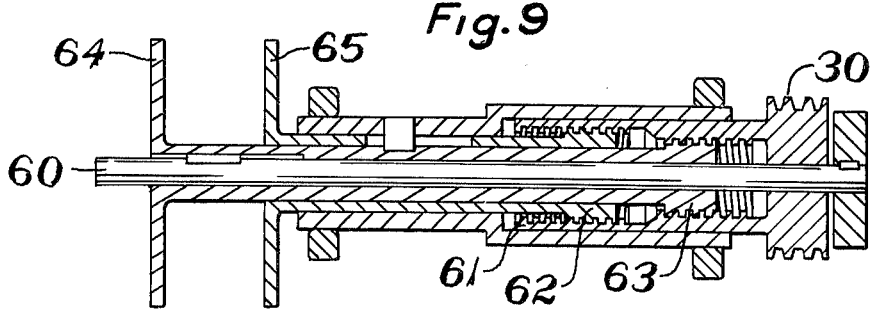

United States Patent Office 3,235,435
Patented Feb. 15, 1966

3,235,435
MACHINE FOR BUILDING PNEUMATIC TIRES
Jacques Pouilloux, Saint-Gratien, France, assignor to Pneumatiques, Caoutchouc Manufacture et Plastiques Kleber Colombes, Paris, France, a corporation of France
Filed Sept. 29, 1964, Ser. No. 399,921
Claims priority, application France, Oct. 3, 1963, 949,485
16 Claims. (Cl. 156—415)

The present invention relates to machines for building pneumatic tires, the machine being of the type comprising a drum mounted to overhang at the end of a horizontal rotatable shaft. The invention is particularly applicable to machines of this type in which the tire building drum comprises two circular end plates which are axially movable towards and away from each other and have a tubular flexible bladder there between constituting the building surface which is substantially cylindrical when the end plates are remote from each other.

According to this invention, one of the end plates is fixed upon a central shaft and the other upon a sleeve coaxially surrounding said shaft with the shaft and the sleeve being rotatable together but capable of sliding telescopically into each other in order to effect the axial movement of the end plates of the drum. A particular feature of the invention resides in the mechanism for effecting the axial movement of the end plates of the drum. This comprises a screw located in the extension of the axis of the drum and provided with two threaded portions of opposite hand being engaged respectively in the threaded end of the central shaft at the end thereof opposite that on which the drum is mounted and in the adjacent threaded end of the sleeve. The screw is held from axial movement but is selectively rotatable by the building machine motor to move the drum end plates relative to each other.

The fact that the screw has two threads of opposite hand and is engaged in those ends of the shaft and the sleeve which are remote from the ends bearing the end plates of the drum ensures important advantages from the constructional point of view. One of these is that the threaded parts of the shaft and of the sleeve are adjacent to each other and, hence, the control screw may be short which simplifies the necessarily accurate machining of this member. Moreover, this screw constitutes a single piece and since it acts upon the shaft and the sleeve in the extension of the axis of the drum its action is well balanced. Finally, since the shaft and the sleeve are only threaded at one end the sealed mounting of the end plates of the drum on the other extremity of the shaft and on the other extremity of the sleeve, as well as the air admission system into the drum, are much more simplified. It is thus possible to have a simpler and lighter drum, and this is important since the drum is overhung.

The coaxial screw may take the form of a sleeve integral with the driving pulley and provided with two threads of opposite hand each engageable with a threaded portion of the coaxial shaft and sleeve.

Preferably, one of the threads is inside the screw and engageable with an exterior threaded part of the central shaft while the other, oppositely-handed, thread of the screw is on the outside of the latter and engageable with a threaded interior section of the sleeve.

According to another feature of the invention, the drum is rotatable independently of the longitudinal movement of the end plates by means of an exterior sleeve concentric with the shaft and the end plates. The drum rotation is effected by the same motor as that which moves the end plates by means of two driving transmissions operable at different speeds. These are selectively operable by interposed clutching devices allowing one or other of the driving transmissions to be set in motion in such a way as to be able to rotate the drum at either of two different speeds.

An additional feature of the invention resides in the controls for the machine which permit ready performance of different tire building operations in preselected sequence which are initiated either manually or automatically.

Other characteristics of the present invention will become clear in the course of the description which follows, reference being made to the accompanying drawings, forming a part of this application, in which.

Figure 7:
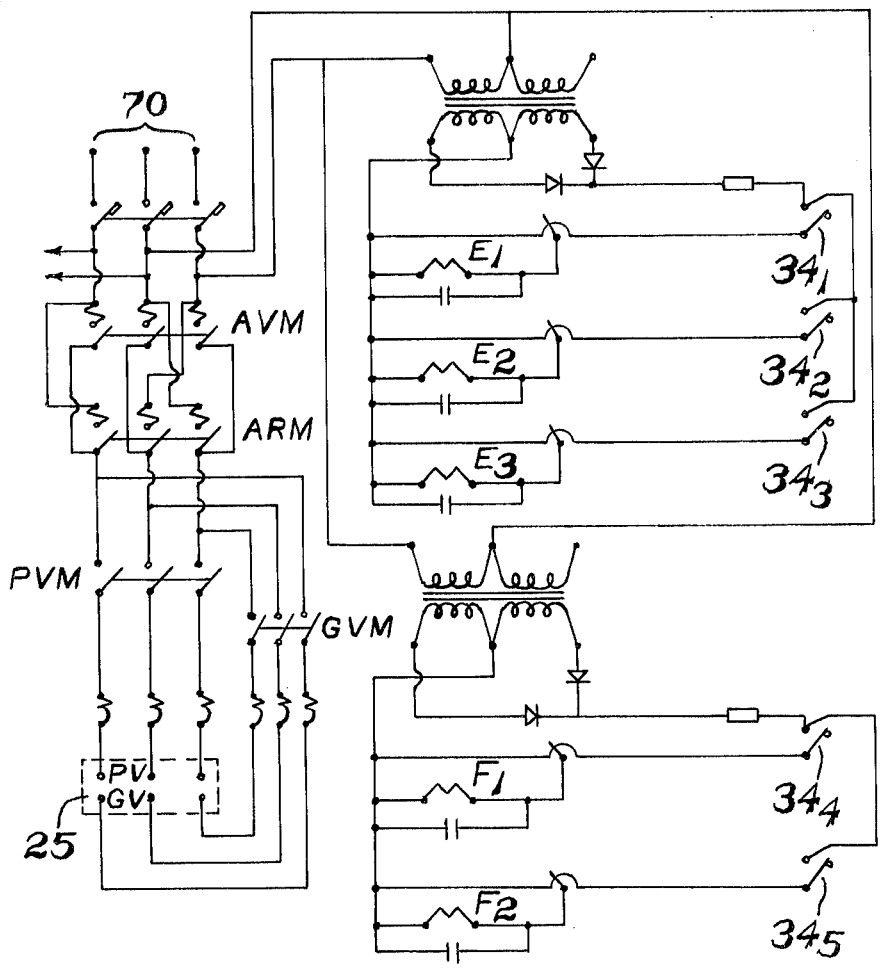
Figure 12:
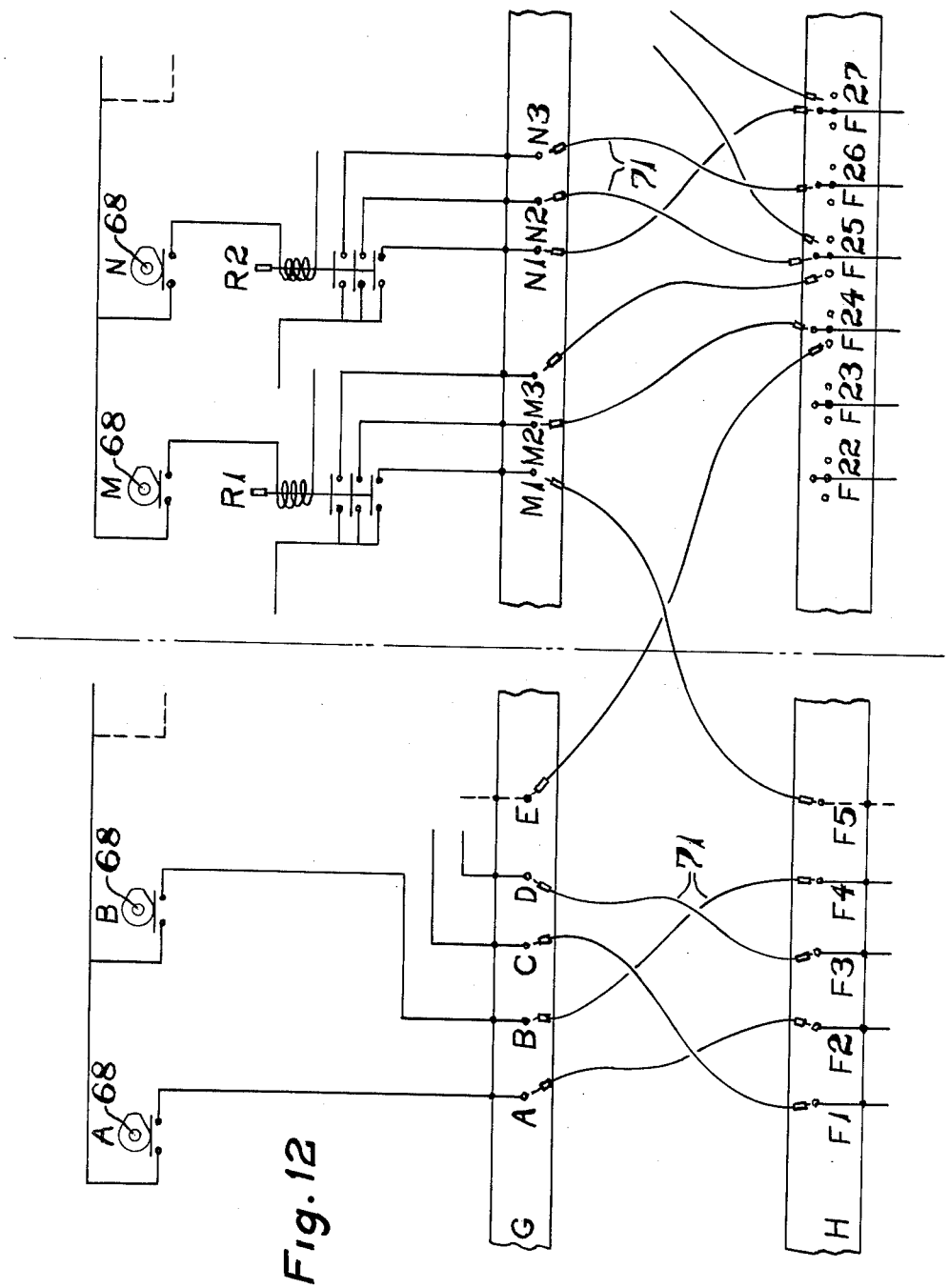

FIGURE 7 diagrammatically shows the electrical control circuit of the motor, the clutches and the brakes of the machine;

FIGURES 8, 9, 10 and 11 are somewhat diagrammatical illustrations in longitudinal section of different embodiments of mechanism for moving the end walls of the drum; and FIGURE 12 diagrammatically shows the electrical control circuit for the various operations effectable by the machine.

Figure 1:
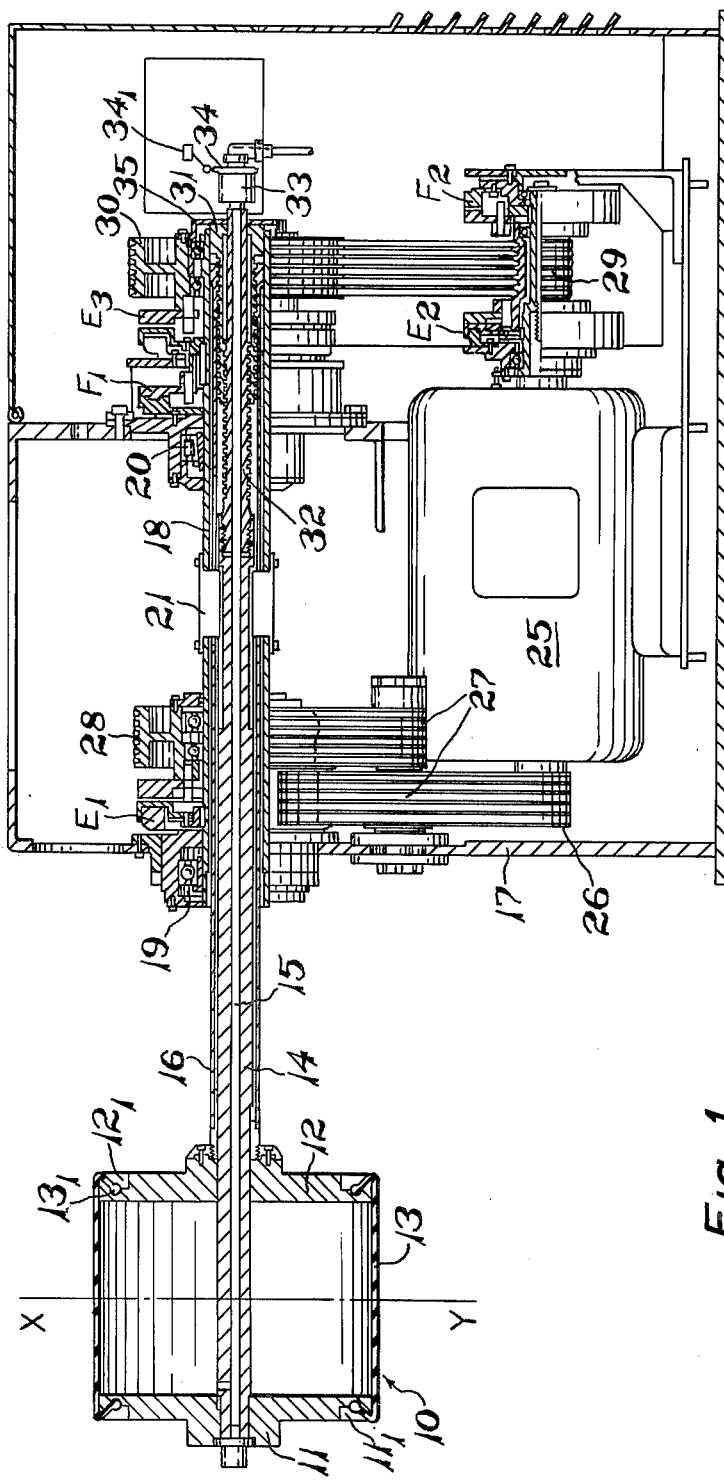
FIGURE 1 is in longitudinal section through the machine.

The complete assembly of the machine shown in FIGURE 1 may be divided in order to simplify the description, into two principal parts, namely:

(1) The building drum and its supports, and
(2) The control mechanism for actuating the drum.

These two principal sections of the machine are described in detail hereinbelow.

The building drum

This drum, given the general reference numeral 10, is shown at the left-hand side of FIGURE 1 as comprising two circular end plates 11 and 12, movable in a longitudinal axial direction on either side of a central vertical plane XY, and a flexible bladder 13 which is tubular in form, and reinforced by means of cords located preferably in a longitudinal direction, that is to say in a direction parallel to the axis of the rotation of the drum. In place of these longitudinal cords or in addition thereto, the bladder 13 may be reinforced by cords located in the circumferential direction of the drum.

The flexible bladder 13 is provided with beads $13_1$ reinforced by circular wires. However, the bladder may alternatively have beads without wires. The bladder is fixed to the end plates 11–12 by means of annular members $11_1$–$12_1$. The drum may also have an end-plate tensioning system such as that described in my French Patent No. 1,242,884 of July 7, 1951.

The drum assembly is mounted to overhang the end of a shaft constituted by:

(1) A central shaft 14 provided with an axial bore 15 and integral with the left-hand end plate 11, and
(2) A coaxial sleeve 16 integral with the right-hand end plate 12.

The shaft 14 and the sleeve 16 are rotatable together but can have relative sliding movement axially. In the interior part of the framework 17 of the machine the shaft 14 and sleeve 16 are surrounded by a tubular sleeve 18 supported by two bearings 19, 20. The tubular sleeve 18 is axially fixed but is mounted for rotation with the shaft 14 and the sleeve 16 by means of a key 21. The key 21 engages in the longitudinal grooves of the shaft and of the sleeve 16 in such a way as to allow them to slide telescopically one within the other.

The drum as described hereinbefore may have several characteristic positions viz.:

(1) Tire building position (FIGURE 1) in which the end plates 11 and 12 are separated from each other in such a way as to stretch the bladder 13 which takes on a cylindrical form, (2) A tire shaping position (FIGURE 2) in which the plates 11 and 12 are urged towards each other while the bladder is distended by compressed air introduced through the bore 15 of the shaft 14 in order to transversely curve the tire built on the drum, (3) A tire removing position (FIGURE 3) in which the plates are urged towards each other while the drum is evacuated in order to draw up the bladder between the end plates 11 and 12. The drum then takes on the form of a hollow rim which allows the built carcass of the tire to be removed from the drum in the same way as a tire is removed from its rim, by taking the tire beads successively over and off the end plates.

Figure 2:
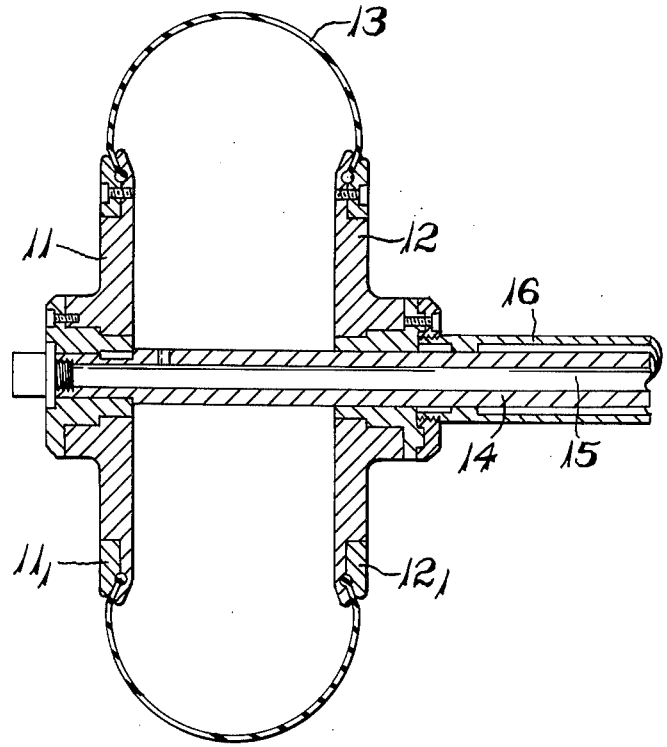
FIGURES 2 and 3 are axial sections through the drum of the machine of FIGURE 1, respectively, illustrating the drum in its expanded position and in the tire removing position.
Figure 3:
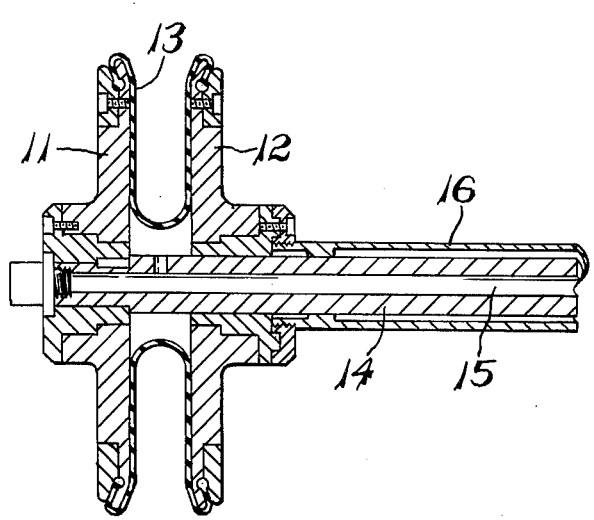
Figure 4:
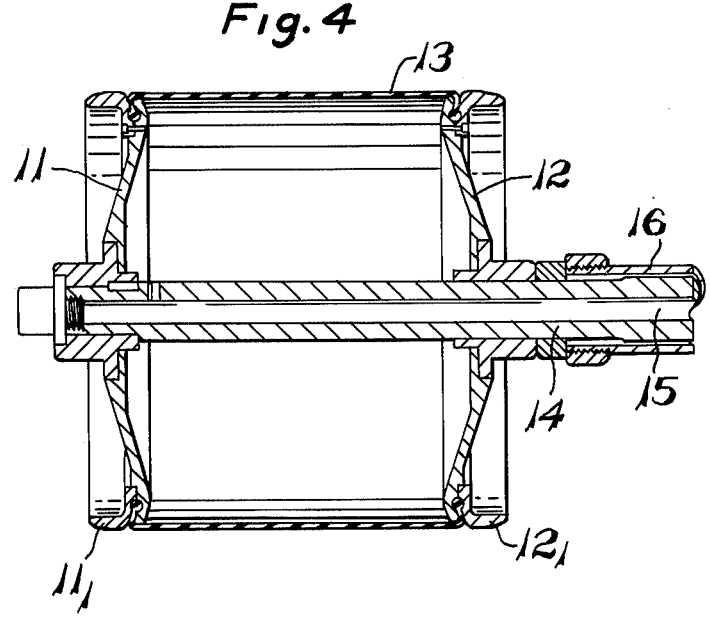
FIGURES 4 and 5 are axial sections through another type of drum which can be used on the machine.

The intermediate stage, corresponding to the tire shaping position illustrated in FIGURE 2, may be dispensed with when it is desired to effect the shaping of the tire upon a separate machine according to the conventional process. In this case, although the drum illustrated in FIGURES 2 and 3 is suitable, it is preferable to use a drum of the type shown in FIGURES 4 and 5 and described in my French Patent 1,242,880 filed on June 25, 1949, or a drum of the type described in my French Patent 1,282,354, filed December 22, 1960. In either of these drums the middle of the right-hand end plate 12 is free upon the shaft 14 in such a way that the drum may take up the following positions:

(1) A tire building position (FIGURE 4) in which the end plates are separated from each other under the effect of the pressure of air introduced into the drum so as to stretch the bladder 13. The right-hand end plate 12 can then abut against the end of the sleeve 16, (2) A tire removing position (FIGURE 5) in which the right-hand end plate 12 is urged towards the left-hand plate 11 under the effect of the vacuum created in the drum in such a way that the assembly of the two end plates may be passed over simultaneously by the tire when it is being removed from the drum.

*The control mechanisms*

The control mechanisms described hereinafter allow the operational cycle to be effected with or without a tire shaping operation as has been seen above. These mechanisms have as their object to urge together or to separate the ends of the drum, to cause rotation of the drum 10 at various speeds, and to admit compressed air into or to create a vacuum in the drum, or to put the interior of the drum into communication with the atmosphere.

*Axial movement of the drum end plates*

Axial movement of the end plates 11 and 12 of the drum, in order to obtain the positions of FIGURES 1, 2 and 3, is effected according to the invention by means of a screw located in the extension of the axis of the drum assembly, said screw thus forming an extension of the shaft 14 and being located in the interior of that end of the sleeve 18 which is opposite the drum 10. As shown in FIGURE 1 this screw, designated by the reference numeral 31, is in the form of a sleeve provided with two threaded portions of the same size but of opposite hand; an exterior thread which is screwed into a corresponding threaded part provided on the interior of the end of the sleeve 16, and an interior thread which is screwed upon a corresponding externally threaded part of a member 32 which is rotatable and axially movable with the shaft 14. This especial type of screw 31, which is at the same time screw and nut, is connected, by means of a bell-shaped member 35, to the pulley 30 in such a way that these parts are rotatable but axially fixed. Moreover, it can be seen that the member 32 is extended towards the exterior of the sleeve 18 by means of a smooth section serving as an interior support to the right-hand extremity of the screw 31. To ensure the good operation of this mechanism, the interior space of the sleeve 16 and of the sleeve 18 is filled with oil, the sealing to the exterior and to the pneumatic circuit being ensured by means of suitable toric seals.

It can thus be seen that when the screw-nut 31 rotates in relation to the shaft 14 and to the sleeve 16 the latter are axially displaced in opposite directions and urge the plates 11, 12 of the drum, with which they are respectively integral, away from or towards each other. This movement of the plates 11, 12 is controlled by means of a cam 34 integral with the fixed section of the rotary joint 33 on the end of the shaft and thus axially movable with the shaft. The cam 34 is moved past a series of electrical contacts, such as $34_1$, controlling the operation of clutch E3 and a brake F1, thus bringing about the stopping of the end plates at exactly predetermined positions. The clutching and braking system is hereinafter described in greater detail when referring to the control of the rotation of the drum.

*Rotation of the drum*

The rotation of the drum is effected at either of two selected speeds by means of a single electrical motor 25 the movement of which is transmitted by means of one or other of the two drive systems. The first of these drives allows the drum to be rotated at a slow speed. It comprises a system of pulleys and belts driven by the pulley 26 located at the left-hand end of the driving motor 25. This system includes stepped intermediate speed reduction pulleys 27. The driven pulley 28 is mounted free to rotate about the tubular sleeve 18 but is integral with one element of an electromagnetic coupling or clutch E1. The other element of this coupling is fixed to the sleeve 18 in such a way that when the coupling E1 is excited, the pulley 28 is connected to the sleeve 18 and transmits to it the rotary movement of the motor 25 at the slow speed resulting from the reduction provided by the pulleys 27.

The second drive system allows the drum to be rotated at a higher speed because its speed is less reduced. This system is driven from the right-hand end of the motor 25 and comprises an electromagnetic coupling or clutch E2, electromagnetic brake F2 and an interposed pulley 29. One element of clutch E2 is integral with the shaft of motor 25 and the other element is integral with the pulley 29 which turns freely upon an axis situated in line with the shaft of motor 25. This pulley is connected by means of belts to a pulley 30 that is freely rotatably mounted about the end of the tubular sleeve 18. The pulley 30 is also rotatable with one of the elements of an electromagnetic coupling or clutch E3 the other element of which is integral with the sleeve 18. It will be evident that, when the couplings E2 and E3 are excited, the drum 10 is then rotated at high speed by means of the pulleys 29 and 30 and by the sleeve 18, the latter being rotatable with the shaft 14 and with the sleeve 16, as has been described above.

The second drive system which has just been described comprises an electromagnetic brake F1 in addition to the brake F2. The brake F1 is concentric with the sleeve 18 and is located near the coupling E3. This brake F1 comprises a fixed element integral with the frame of the machine and a movable element rotatable with the sleeve 18. This brake allows the rotary movement of the sleeve 18 to be stopped when the coupling E3 is de-energized. As shown in FIGURE 1, it is possible to combine the movable element of the brake and the corresponding element of the coupling E3 into one single element in such a way that the operation of these two mechanisms is synchronized. The brake F2, which is located in line with the shaft of the motor 25, is provided to stop the rotation of the motor when the operational cycle of the machine is stopped or reversed.

*Pressurizing and de-pressurizing of the drum*

Figure 6:
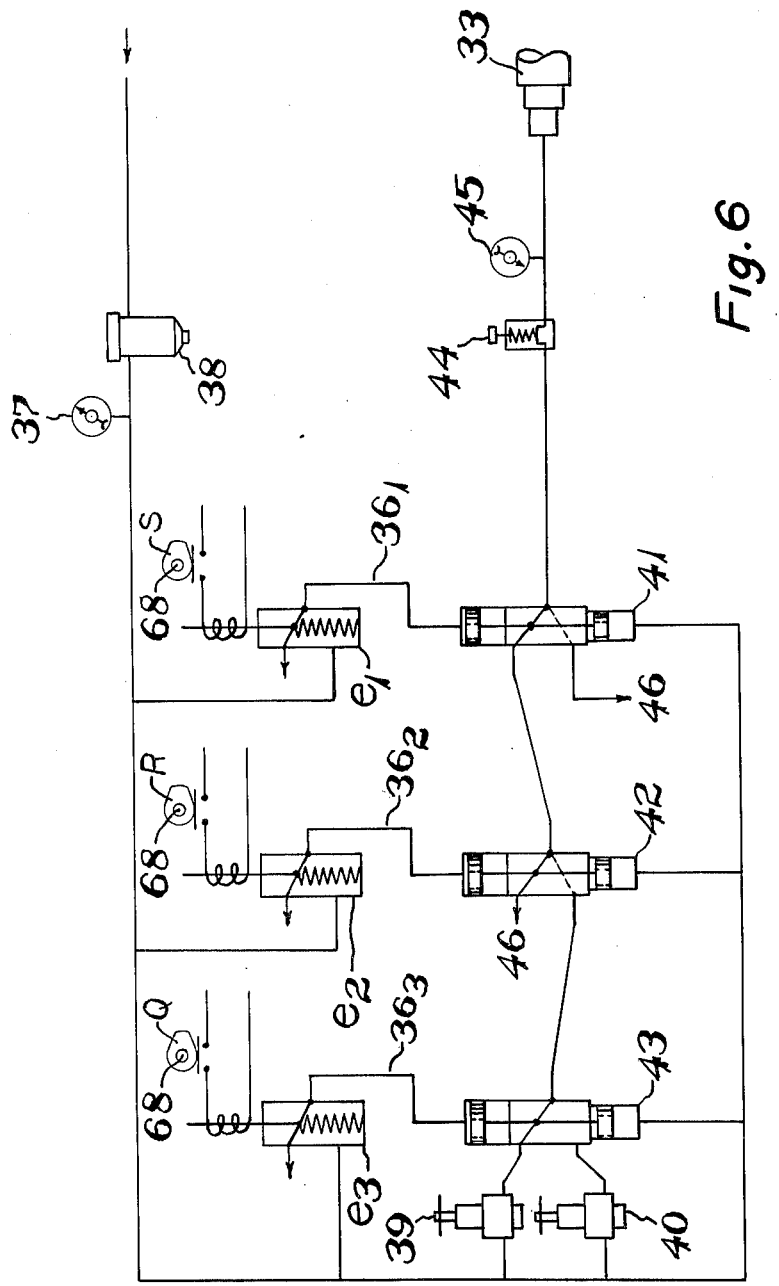
FIGURE 6 shows diagrammatically the electrically operated pneumatic controls for the drum.

The introduction of air into the drum and exhaust of air therefrom are effected through the axial bore 15 of shaft 14 which has the end remote from the drum connected to the pneumatic circuit by means of the rotary joint 33. This circuit, as schematically illustrated in FIG. 6, conducts the compressed air, which enters by the rotary joint 33 of shaft 14, through one or the other of the pressure reducing devices 39, 40 and distributor valves 41, 42 and 43. In this circuit are also suitable manometers 37 and 45, a filter 38 and safety relief valve 44.

One end of each distributor valve (the lower end shown on the drawing) is connected to the main piping and, so, directly receives compressed air. The other ends of distributor valves (the upper ends shown on the drawing) are connected to the main piping through pipes $36_1$, $36_2$, $36_3$ and electrically operated valves $e_1$, $e_2$ and $e_3$, respectively. The latter valves are activated by means of contacts actuated, respectively, by cams Q, R and S. These cams are mounted on a common cam-shaft 68 which is selectively rotatably indexed by means, not shown, but which may include a suitable electrically operated ratchet drive, stepping relay or other known mechanism.

In order to evacuate the drum, the electrically actuated control valves $e_1$, $e_2$ and $e_3$ are at rest, as shown in FIGURE 6. The upper ends of the distributor valves 41, 42 and 43 are then evacuated through the valves $e_1$, $e_2$ and $e_3$ and the slides of the distributor valves 41, 42 and 43 held in their upper positions by compressed air. The axial channel 15 is then connected with distributor valve 42 through the distributor valve 41. This permits the air contained in the drum to escape to the atmosphere through the exit 46 of distributor valve 42. The needle of manometer 45, therefore, points to zero.

Introduction of compressed air inside the drum is effected when the contact of electrically actuated valve $e_2$ is shut by the cam R. This places the slide of distributor valve 42 in a position opposite to that shown in FIGURE 6. The valves $e_1$ and $e_3$ are then at rest. The air, the pressure of which is regulated by the reducer 39, passes through distributor valves 43, 42 and 41 to enter the drum and the manometer 45 indicates the pressure of the air in the drum.

If it is desired to place the drum under a greater pressure, the valves $e_2$ and $e_3$ are shut, actuated by operation of the cams R and Q, and the valve slides are then disposed in a position contrary to that shown in the drawing. The air, the pressure of which is adjusted at a higher value by the reducer 40, now passes through the distributor valves 43, 42 and 41 to enter the drum.

Creation of a vacuum inside the drum, in order to draw the bladder into the interior of the drum when the end plates have been moved together (the tire removing position, see FIGS. 3 and 5), is achieved by cam S closing the contact of the electrically actuated valve $e_1$. The operation of this valve $e_1$ places the slide of the distributor valve 41 in the opposite position to that shown in FIGURE 6 and the drum is thus placed in communication with the source of vacuum 46. The manometer 45 indicates the de-pressurizing, i.e. fall in pressure. The control valves $e_2$ and $e_3$ for the distributor valves 42 and 43 then are at rest.

To summarize what has been said, the operation of the machine which has thus been described is as follows, taking for example the building of tires with inextensible breaker layers. In this case the process comprises four successive principal stages.

(1) The locating of the layers of carcass upon the cylindrical drum (FIGURE 1).

(2) Shaping of the carcass upon the same drum effected by moving the end plates toward each other and expanding the bladder (FIGURE 2).

(3) Location of the inextensible breaker layer and of the tread upon the drum in curved position (FIGURE 2).

(4) Removal of the built tire by bringing the end plates more closely adjacent each other and drawing the bladder into the interior of the drum (FIGURE 3).

Figure 5:
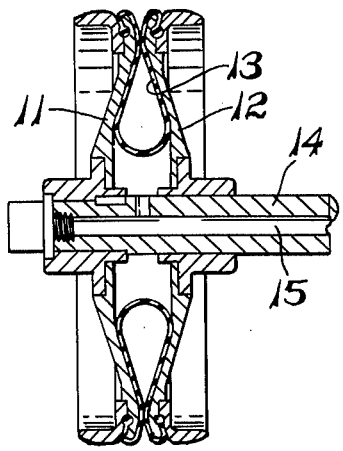

If, on the other hand, the example is taken of the building of an ordinary tire without a breaker layer, or again the building of a tire with breaker layer where the tire shaping operation is effected subsequently upon a special machine known as the shaping apparatus, the building process only comprises the building stage (FIGURES 1 or 4) and the tire removal phase (FIGURES 3 or 5).

Conversely, the machine may be used only as a tire shaping apparatus for the carcasses of tires previously built upon any cylindrical drum. The process in this case would comprise four stages.

(1) Mounting of the carcass upon the drum, the end plates of which are adjacent each other as in FIGURES 3 or 5.

(2) Shaping of the carcass, the end plates being at the intermediate position and the bladder expanded as in FIGURE 2.

(3) Positioning, finally, the finishing elements of the carcass comprising the side bands, breaker layer, tread, the drum being in the expanded position according to FIGURE 2.

(4) Removal of the finished tire with the drum restored to the position of FIGURES 3 or 5.

*Modifications*

The invention is, of course, not limited to the embodiment described, since a number of variations can be readily devised. Thus, FIGURE 8 shows another embodiment of the system for effecting the axial movements of the end plates of the drum. As here shown, a control screw 51 (corresponding to the screw-nut 31) and the drum assembly are supported by a shaft 50 which is preferably provided with an axial bore, not shown, similar to the bore 15 for the passage of air to and from the drum. In this case, the screw 51, integral with the pulley 30, comprises two exterior threads of opposite hand engaged, respectively, with the corresponding threaded portions provided in the interior of the ends of a shaft 52 and a sleeve 53 integral with end plates 54 and 55 of the drum assembly. A rotary movement is communicated to the drum by means of shaft 50 or by means of the tubular sleeve 18.

In the case of FIGURE 9, a control screw 61 is interiorly threaded with two threads of opposite hand and is engaged with two corresponding threaded portions provided, respectively, on the exterior of a shaft 63 and of a sleeve 62 integral, respectively, with the end plates 64, 65 of the drum. The shaft 63 and sleeve 62 have a shaft 60 passing therethrough similar to the shaft 50 in FIGURE 8.

FIGURES 10 and 11 show modifications similar to those of FIGURES 8 and 9, respectively, but in which the shafts 50 and 60 have been removed.

It will be observed that in these modifications the control screw, 51 or 61, is still engaged with the threaded ends of the drum shaft and of the sleeve opposite to the ends thereof bearing the drum in such a way that the control screw is always very short. As indicated above, this form of control screw allows a simple and light assembly of a drum which is very convenient for the operator.

*Electrical control of the machine*

The afore-described machine, whether constructed as shown in FIG. 1 or as modified according to one or more of the other embodiments previously set forth, comprises an electrical control circuit which is diagrammatically illustrated in FIGURES 7 and 12. As shown in FIGURE 7, the single motor 25, employed for both rotation of the drum 10 and axial movement of the ends thereof, is preferably of the two speed, reversible type. This motor is connectible to the terminals 70 of a three phase alternating current power supply for effecting rotation of the motor in the forward direction by operation of switch AVM and is connectible for rotation in the reverse direction by switch ARM. The rotation in either direction can be at either high or low speed by selective actuation of either switch GVM or PVM, respectively.

The electrical clutches $E_1$, $E_2$ and $E_3$ and brakes $F_1$ and $F_2$ are supplied with direct current through a full wave rectifier connected to one phase of the three phase power supply. Selective actuation of the clutches and brakes is effected by separate cam operated electrical switches $34_1$, $34_2$, $34_3$, $34_4$ and $34_5$ actuated by cams on the cam shaft 68 as has been previously described when referring to the operation of the pneumatic control circuit.

FIGURE 12 illustrates the manner in which cams on the cam shaft 68 are employed to control operation of the functions previously described as well as those of ply stock and tread stitcher and other well-known devices with which the tire machine is normally equipped but which have not been here illustrated. Thus, each cam A, B . . . M, N of this cam shaft is adapted to close a contact feeding the terminals of an input collector strip G. An output terminal collector strip H is connected to the control circuits of the devices effecting the various operations such as stitching devices, the motor 25, the electrically actuated valves $e_1$, $e_2$, $e_3$, etc.

To each terminal F1, F2 . . . F27 of the collector strip H there corresponds an "operation" of the machine, each "operation" including the maximum number of functions which it is practical to group under the central control of a single relay without harming the flexibility of adjustment or use of the machine. In order to effect any operational cycle, established according to the operational method for building any particular tire, electrical connections are established between the terminals of the connector strip G and H by means of a system of movable plugs 71 similar to those used in manual telephone switchboards. Hence, the control circuit has the important advantages that changes in number and sequence of operations may be easily and quickly effected. Operation of the cam shaft may be manual or electrically effected to sequentially move the cams to and from switch actuating position.

The closing of a contact by means of a cam brings about, by means of the above-mentioned plug-in connections the excitation of an "operational relay," located below the contacts F, and the "operational relay" in turn excites the secondary relays or the power relays controlling a group of concomitant or successive functions.

A number of different operations may be necessary at the same time for the carrying out of certain stages of construction of a tire. This is possible by provision in the apparatus for causing the circuits, established by a cam actuating the associated contacts, to be directly switched to the circuits controlling the several operations which are then normally carried out. But if only one of these several operations is necessary at another stage of tire building, the circuits established by the appropriate cam at this stage do not include the unnecessary operations. The conventional means of providing for this situation consists in using as many cams, such as A and B, for simultaneous switch operation as there are functions to be carried out in a certain stage. Given the complexity of operations of tire building, the number of cams necessary for such a system would be extremely large and would result in an impractical cumbersomeness. This is avoided in the circuit of this invention by allocating the cams into two groups:

(1) The "simple" cams such as A and B reserved for the stages which only control one single operation at a time. (These are the cams at the left in FIGURE 12.)

(2) The "divided" cams such as M and N (shown at the right in FIGURE 12) which are reserved for the stages controlling several operations.

The division is brought about by the interposition of relays such as R1 and R2 between the switches controlled by the cams such as M and N and the terminal connector strip G. The relay R1, for example, provides circuits to three contacts M1, M2 and M3 (without this number being limiting) when the cam M is actuated to contact closing position. The number three is of course selected only for purposes of illustration and a greater or lesser number of circuits may be controlled by relay R1.

In a similar manner the operational terminals of the connector strip H have been multiplied to a number greater than the probable frequency of utilization. FIGURE 12 shows, for example, four terminals each for the operations F22 to F27. The connections by means of plugs 71 may thus be ensured between terminals M1, M2, M3 or N1, N2, N3, etc. . . . and the terminals F22, F23, etc. as needed, with complete freedom and to any number (within the limit of available contacts) while maintaining complete independence for the various operations.

It can be seen, for example, that the switch actuated by cam M may feed, by means of the relay R1, the terminals M1, M2, M3 of the connector strip G, which terminals are connected to the terminals F5, F24, F25, in such a way as simultaneously to control three functions corresponding to three operations or three series of operations. However, if relay R2 is then open, the current provided at the terminal F25 cannot, in spite of the connection between F25 and N2, return to the terminals F26 and F27. Conversely, when the cam N closes the relay R2 and cam M is operated to de-energize relay R1, the current is conveyed to the terminals N1, N2, N3 connected to the terminals F25, F26, F27 in such a way that the function associated with the terminal F25 is controlled at the same time as the function associated with the terminals F26 and F27 without there being any return of current towards F5 and F24. It can also be seen that the function associated with terminal F25 may be selectively controlled by means of two different cams without risk of interference between the other functions associated with terminal F25, that is to say on the one hand F25 and F24 and on the other hand F26 and F27. This control system and the connection by means of movable plugs 71 thus allow a great flexibility in adaptation of operation of the machine to the various operational methods for the building of different types of tires.

The structure of the illustrated and described embodiments of the invention is susceptible of variations and adaptations without departing from the essential principles of the invention.

Having thus defined the invention, I claim:

1. A machine for building pneumatic tires comprising a drum assembly including two circular end plates and a flexible cylindrical bladder with the said bladder connected to said end plates to form therewith an air-impervious inclosure, the said drum assembly being selectively movable from a generally cylindrical to a generally oblate spheroidal configuration by relative movement of said end plates and change of air pressure in the enclosure, a tubular sleeve connected at one end to one of said end plates, a shaft extending through said sleeve and connected at one end to the other of said end plates, means supporting said shaft and sleeve for rotation as a unit and for relative axial movement with the ends of said shaft and sleeve remote from said drum assembly adjacent to each other, and means for effecting the said relative axial movement comprising a member rotatably supported coaxially with said shaft and sleeve at a location adjacent to those ends thereof remote from said drum assembly, the said member being restrained from axial movement and including two oppositely threaded portions adjacent each other and engaged respectively with correspondingly threaded adjacent portions on said sleeve and shaft, means to selectively rotate said member in one direction to thereby move said end plates away from each other to dispose the drum in its generally cylindrical configuration and in the opposite direction to move said end plates toward each other for disposing said drum in its oblate spheroidal configuration and means to selectively introduce air under pressure into and exhaust it from said drum.

2. A machine as defined in claim 1 wherein the said threaded member is a sleeve with one of said threaded portions thereon disposed on the interior and engaging an exterior thread on the said shaft, the other of said threaded portions on said member being disposed on the exterior of the member and engaging the threaded portion of the said sleeve connected to an end plate.

3. A machine as defined in claim 1 wherein the said threaded member has the form of a sleeve the outer end of which is integral with a driving pulley.

4. A machine as defined in claim 1 wherein the said threaded member is a sleeve with the said threaded portions thereon both located on the interior of the member.

5. A machine as defined in claim 1 wherein the said threaded member has both of said threaded portions thereon on the exterior thereof.

6. A machine as defined in claim 1 further comprising means to rotate said drum assembly comprising an electric motor, a pulley rotatably driven by said motor about an axis coaxial with said shaft and sleeve, a speed reduction unit driven by said motor and including a second driven pulley rotatable coaxially of said shaft and sleeve and means to selectively connect either one of said driven pulleys to said shaft and sleeve.

7. A machine as defined in claim 6 wherein the said motor has a drive shaft extending from each end with the said speed reduction unit operatively connected to one end and the first-mentioned pulley connected to the opposite end of said drive shaft.

8. A machine as defined in claim 1 wherein the said means to selectively rotate said member include a pulley coaxial with said member and connected thereto, a reversible electric motor, a driving connection between said motor and pulley, and brake means for preventing rotation of said drum when said member is rotated to effect relative axial movement of said end plates.

9. A machine as defined in claim 1 wherein the said means to selectively rotate said member include a pulley coaxial with said member and connected thereto, a reversible electric motor, a driving connection between said motor and pulley, and brake means for preventing rotation of said drum when said member is rotated to effect relative axial movement of said end plates, the said machine further comprising clutch means engageable when said brake means is disengaged to connect said pulley with said shaft and sleeve and thereby rotate said drum whereby a single motor selectively provides rotation of said drum and relative axial movement of the end plates thereof.

10. A machine as defined in claim 9 and further comprising additional brake means selectively operable to prevent rotation of said drum and relative axial movement of said end plates.

11. A machine for building pneumatic tires comprising a drum assembly including two impervious circular end plates and a flexible impervious cylindrical bladder with the said bladder connected to said end plates to form an impervious enclosure, the said drum assembly being selectively changed to and from a generally cylindrical and a generally oblate spheroidal configuration by relative movement of said end plates and change of air pressure in the enclosure, a tubular sleeve connected at one end to one of said end plates, a shaft extending through said sleeve and connected at one end to the other of said end plates, means supporting said shaft and sleeve for rotation as a unit and for relative axial movement with the ends of said shaft and sleeve remote from said drum assembly adjacent to each other, a member restrained from axial movement and rotatably supported coaxially with said shaft and sleeve adjacent those ends thereof remote from said drum, the said member including two oppositely threaded portions engaged respectively with correspondingly threaded portions on said sleeve and shaft, a reversible electric motor, driving connections from said motor to said member and sleeve including selectively operable clutch and brake means selectively operative to effect rotation of said member and simultaneously prevent rotation of said sleeve thereby causing relative axial movement of said sleeve and shaft or to effect simultaneous rotation of said member and sleeve at a first speed, and speed reduction means operatively interconnected between said motor and said sleeve and including a selectively operable clutch effective when engaged to cause simultaneous rotation of said sleeve and shaft at a lesser speed than the said first speed.

12. A machine as defined in claim 11 wherein said clutches and brake are electrically operated, the said machine further comprising means for altering the air pressure in said drum including electrical actuated valve means, and an electrical control circuit interconnecting said clutches, brake, motor and valve means.

13. A machine as defined in claim 12 wherein the said control circuit includes switches controlling said clutches and brake and actuated by relative axial movement of said shaft and sleeve to predetermined positions to immobilize the end plates of those positions.

14. A machine as defined in claim 11 wherein said clutches and brake are electrically operated and the machine further comprises an electrical control circuit interconnecting said clutches, brake and motor, the said control circuit including a plurality of cam actuated switches, a separate rotatable cam for operating each of said cam actuated switches, and a common cam shaft supporting each of said cams and rotatable to different selected positions to effect selected switch actuation.

15. A machine as defined in claim 14 wherein the contacts of said cam actuated switches are connected to a set of input terminals, a set of output terminals each corresponding to a portion of the circuit for performing a function of the machine, and movable plugs for electrically interconnecting selected ones of said input and output terminals.

16. A machine as defined in claim 15 further comprising electrical relay means controlled by certain of said cam actuated switches, the said relays each having a plurality of interconnected contacts interconnected between one of said cam-actuated switches and several of said input terminals to thereby permit a plurality of circuits to be established by closing of a single cam-actuated switch.

References Cited by the Examiner

UNITED STATES PATENTS

| | | | |
|---|---|---|---|
| 2,814,330 | 11/1957 | Vanzo et al. | 156—414 X |
| 3,111,444 | 11/1963 | Pouilloux | 156—416 |
| 3,138,510 | 6/1964 | Hindin et al. | 156—394 X |

EARL M. BERGERT, *Primary Examiner.*

C. B. COSBY, *Assistant Examiner.*